(12) United States Patent
Metternich

(10) Patent No.: US 11,001,317 B2
(45) Date of Patent: May 11, 2021

(54) FIFTH-WHEEL COUPLING AND COUPLING METHOD THEREFOR

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 242 days.

(21) Appl. No.: 16/302,186

(22) PCT Filed: May 20, 2016

(86) PCT No.: PCT/DE2016/100233
§ 371 (c)(1),
(2) Date: Nov. 16, 2018

(87) PCT Pub. No.: WO2017/198242
PCT Pub. Date: Nov. 23, 2017

(65) Prior Publication Data
US 2019/0276099 A1 Sep. 12, 2019

(51) Int. Cl.
*B62D 53/12* (2006.01)
(52) U.S. Cl.
CPC .................. *B62D 53/125* (2013.01)
(58) Field of Classification Search
CPC .................................................. B62D 53/125
See application file for complete search history.

(56) References Cited

U.S. PATENT DOCUMENTS

| 3,181,887 A | 5/1965 | Boylan et al. |
| 3,428,334 A * | 2/1969 | Hils .......................... B60D 1/62 280/421 |

(Continued)

FOREIGN PATENT DOCUMENTS

| DE | 102006020069 A1 | 11/2007 |
| DE | 202007014589 U1 | 3/2009 |

(Continued)

OTHER PUBLICATIONS

International Search Report dated Feb. 10, 2017, in International Application No. PCT/DE2016/100233.

*Primary Examiner* — Kevin Hurley
(74) *Attorney, Agent, or Firm* — Patent Central LLC; Stephan A. Pendorf

(57) ABSTRACT

A fifth-wheel coupling for releasably coupling a fifth-wheel tractor (10) to a semitrailer (20). A kingpin on s semitrailer can be brought into engagement with a fifth-wheel plate on the fifth-wheel tractor. A first insertion coupling part is arranged on the fifth-wheel plate in such a way that it can be moved by means of a lifting device from a decoupled, retracted idle position into a protruding coupling position. A centering unit, e.g., conical centering pins, is provided on the lifting device which centers the relative position of the first insertion coupling part in the decoupled position. The centering is mounted floating against the force of springs on the fifth-wheel plate. The centering is released in the coupling position after the coupling process. After coupling the semi-trailer to the fifth-wheel tractor, during insertion the first plug-in coupling part can easily move laterally for safe insertion due to the released centering, in the case of any small misalignments between the fifth-wheel plate and the kingpin of the semitrailer. After coupling, an undesirable (Continued)

Figure 1:
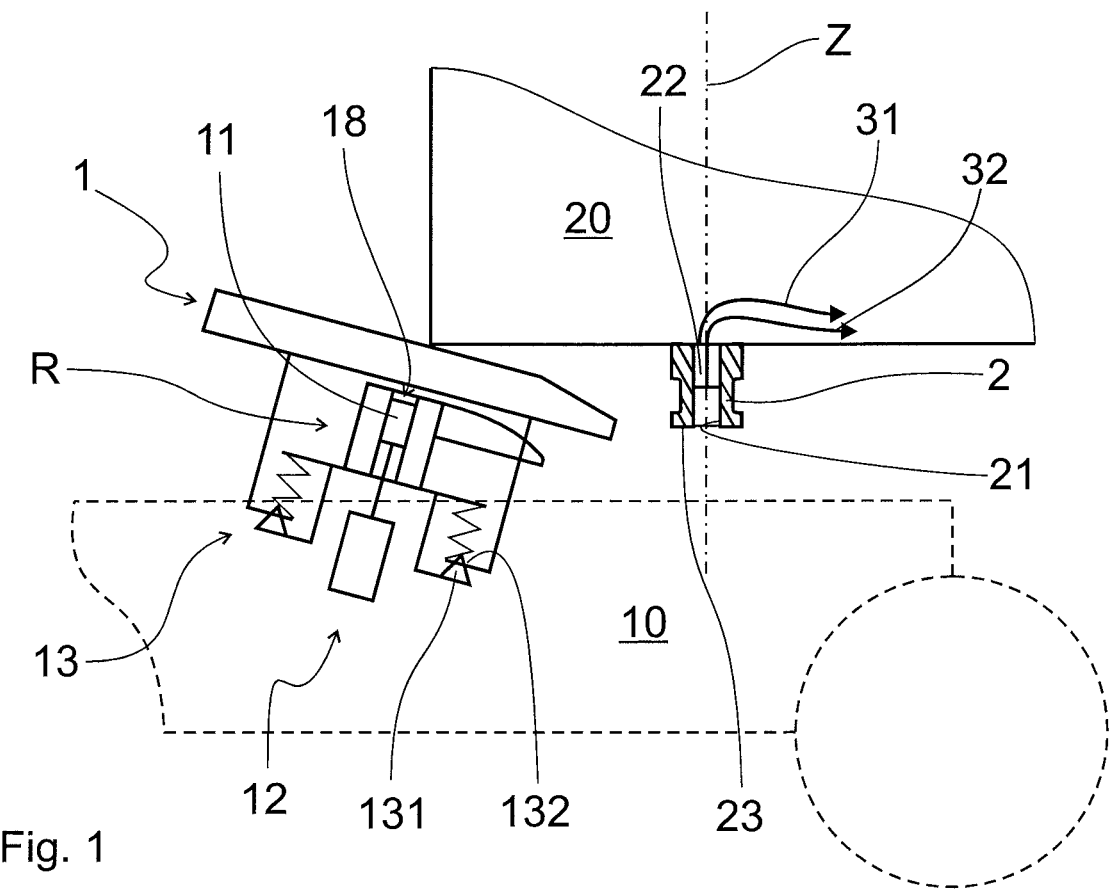

relative movement between the two plug-in coupling parts is prevented, thus minimizing wear.

9 Claims, 2 Drawing Sheets

(56) References Cited

U.S. PATENT DOCUMENTS

| | | | | |
|---|---|---|---|---|
| 3,711,122 | A * | 1/1973 | Holmberg | B62D 53/125 |
| | | | | 280/421 |
| 3,734,537 | A * | 5/1973 | Holmberg | B62D 53/125 |
| | | | | 280/421 |
| 6,709,001 | B1 * | 3/2004 | Morgan | B60D 1/62 |
| | | | | 280/421 |
| 2002/0190497 | A1 | 12/2002 | Metternich | |
| 2009/0096188 | A1 | 4/2009 | Gallego et al. | |

FOREIGN PATENT DOCUMENTS

| | | | |
|---|---|---|---|
| EP | 0058075 A1 | 8/1982 | |
| EP | 0816211 | 1/1998 | |
| EP | 1240067 A2 | 9/2002 | |
| EP | 1240067 B1 | 4/2003 | |
| EP | 1655212 A1 * | 5/2006 | B62D 53/125 |
| EP | 1655212 A1 | 5/2006 | |
| EP | 2899101 A1 | 7/2015 | |

* cited by examiner

FIFTH-WHEEL COUPLING AND COUPLING METHOD THEREFOR

The invention relates to a fifth-wheel coupling for releasably coupling a fifth-wheel tractor with a semitrailer, having a fifth-wheel plate on the tractor, a kingpin arranged on the semitrailer that can be brought into engagement with the fifth-wheel plate, having an inner bore oriented coaxial with the kingpin axis, and with an electric and pneumatic plug-in coupling for releasable connection of electrical and pneumatic lines between the fifth-wheel tractor and the semitrailer, the plug-in coupling having a first plug-in coupling part on the fifth-wheel plate and a second plug-in coupling part in the inner bore of the kingpin, which are rotationally symmetrical, and can be plugged into each other and can rotate relative to each other about the kingpin axis, the first plug-in coupling part disposed on the fifth-wheel plate to be slidable by means of lifting device from a decoupled, retracted rest position into a protruding coupling position coupled into the second plug-in coupling part.

Furthermore, the invention relates to a method for coupling a fifth-wheel coupling comprised of a fifth-wheel plate on a tractor and a kingpin on a semitrailer, wherein the kingpin is brought into engagement with the fifth-wheel plate and electrical and pneumatic lines are connected by means of a plug-in coupling, wherein the plug-in coupling comprises a first plug-in coupling part on the fifth-wheel plate and a second plug-in coupling part in an inner bore of the kingpin oriented coaxially to the kingpin axis, which are rotationally symmetrical, and can be plugged into each other and can rotate relative to each other about the kingpin axis, and the first plug-in coupling part on the fifth-wheel plate is moved from a decoupled, retracted rest position into a protruding coupling position coupled into the second plug-in coupling part when coupling.

Fifth-wheel couplings that allow automatic coupling including of the supply lines are known in different configurations. For example, EP 0 816 211 A2 describes a coupling with a plug-in connection which is accommodated in an inner bore of the kingpin, in which, however, the plug-in sleeve attached to the fifth-wheel plate moves along with the swiveling movements of the semitrailer and must therefore also be aligned with regard to its rotational position during coupling.

Other mechanically very complex constructions for such a fifth-wheel coupling are known from U.S. Pat. Nos. 3,181,887, 3,428,334 and EP 0 058 075 A1.

In EP 1 240 067 B1 a practical solution for an every-day use of a fifth-wheel coupling has been developed. This coupling has the above features. Furthermore, a further development with regard to a two-pole electrical connection has been described in DE 20 2007 014 589 U. A disadvantage of these fifth-wheel couplings is that when coupling-in a centering of the parts to be plugged together is not given and therefore errors arise in the coupling process. Furthermore, during the coupling process and also in the coupled state, additional wear occurs on the plug-in coupling due to undesired relative movements between the plug parts.

Based on the EP 1 240 067 B1, it is an object of the invention to make the coupling process even more reliable and to reduce wear on the connector.

This object is achieved with a fifth-wheel coupling according to claim 1 and a method for coupling this fifth-wheel according to claim 9.

Thereby, that the lifting device is provided with a centering unit, which centers the relative position of the first plug-in coupling part in the rest position, wherein after the coupling process in the coupling position of the first plug-in coupling part in the second plug-in coupling part the centering is released, the first plug-in coupling part which is arranged displaceable on the fifth-wheel tractor is centered in such a manner, that during mechanical engagement of the kingpin in the fifth-wheel plate a perfect mating is made possible by means of the lifting device. At the same time, the centering is released directly during the coupling process to allow small compensating movements, namely when moving the first plug-in coupling part with the lifting device for engaging in the second plug-in coupling part. After coupling the semitrailer to the fifth-wheel tractor, during insertion the first plug-in coupling part can easily move laterally for safe insertion due to the released centering, in the case of any small misalignments between the fifth-wheel plate and the kingpin of the semitrailer. After coupling, an undesirable relative movement between the two plug-in coupling parts is prevented, thus minimizing wear. In contrast, by the centering (fixing) of the first plug-in coupling part in its rest position, it is prevented that general shocks and in particular vibrations during the coupling process, namely driving under the tractor with its fifth-wheel under the semitrailer, cause a misalignment of the first plug-in coupling part relative to the second plug-in coupling part.

According to the method, the object is achieved by the following steps: centered holding the first plug-in coupling part in the decoupled, retracted rest position, and releasing the centering of the first plug-in coupling part while moving the first plug-in coupling part into the coupled, protruding coupling position. Thus, the first plug-in coupling part can adapt during insertion into the second plug-in coupling part with respect to small misalignments. Furthermore, in the coupled state relative movements between the two plug-in coupling parts can be avoided since slight tilting between fifth-wheel plate and kingpin that occur during operation are not transferred to the plug-in coupling. These measures lead to the avoidance of errors in the coupling process and to reduction of wear.

If the centering unit has adjusting means for accurately aligning the relative position of the first plug coupling part in the x and y directions, wherein the kingpin axis defines the z direction, the relative position of the first plug coupling part with respect to the inner bore of the kingpin and the second plug coupling part within this inner bore can be adjusted and reset. The adjusting means are, for example, elongate slots in the x and y direction or similar adjusting elements. With these adjusting means on the centering unit thus fine deviations in the geometry of the fifth-wheel plate, the coupling position for the kingpin, and the like, can be compensated. This adjustment can be done on a separate assembly bench before the final assembly of the corresponding fifth-wheel on the tractor.

If the centering unit has guide springs which support the first plug-in coupling part in its position in the coupling position, the central centering position of the first plug-in coupling part is maintained by the force of the springs provided there. In the case of misalignments or relative movements between the fifth-wheel plate and the kingpin, in particular slight angular deviations, the first plug-in coupling part moves against the force of the springs—virtually floating—into its optimum position. At the same time, the springs prevent any decentering of the first plug-in coupling part, in particular during the coupling process, shortly before the two plug-in coupling parts come into contact with each other.

Thereby, that two conical centering pins are provided on the centering unit for centering, which engage in associated centering holes of the first plug-in coupling part in the rest position, a relatively simple designed centering means is provided. The conical centering pins allow high-precision return to the centered x and y position. In the case of strong shocks it is avoided that the first plug-in coupling part is shifted undesirably.

When the lifting device together with the centering is mounted floating against the force of springs on the fifth-wheel plate, and the lifting device is provided with a centering a ramp which cooperates during the coupling process with the underside of the kingpin so that the lifting device is depressed with centering against the spring load, a spring-loaded press fit of the stop provided in the lifting device is achieved against the underside of the kingpin of the coupled semitrailer. Therein, the bearing surface can be in the form of, for example, a lifting cup, in which the first plug-in coupling part is guided by the lifting device in its lifting movement.

If the lifting device has a drive, for example, a pneumatic cylinder for powering lifting operation, which is triggered or triggered after locking of the kingpin in the fifth-wheel plate, the mating of the two plug-in coupling parts is carried out after the mechanical connection of the fifth-wheel. In addition to a pneumatic actuation, of course, a hydraulic or electric drive of the lifting device is possible.

Thereby, that the lifting device comprises a lifting cup with an opening, wherein the first plug-in coupling part is displaceable in the lifting cup by the lifting device from a retracted rest position into the position coupled into the second plug-in coupling part projecting through the opening, the first plug-in coupling part is kept protected in its retracted rest position within the lifting cup. Not until the coupling process is the first plug-in coupling part, by lifting up through the opening of the lifting cup and into the there temporarily positioned kingpin, and thus into the second plug-in coupling part, that is, moved into the coupling position.

In order to avoid that dirt, precipitation or the like can penetrate into the opening of the lifting cup and thus into the first plug-in coupling part, the opening is covered in a covering position by one or two pivotable cover elements, wherein the cover elements are spring loaded in the covering position and can be opened during the coupling process by the kingpin against the spring force. Thus, the upwardly open first plug-in coupling part is protected within the fifth-wheel coupling from dirt and excessive moisture, so that the electrical contacts remain clean and entry of dirt into the pneumatic system is largely avoided.

Accordingly, the method according to the coupling process is characterized in that the first plug-in coupling part is supported floating in the coupled, protruding coupling position, whereby a first plug-in coupling part associated bearing surface is resiliently pressed against the underside of the kingpin. The associated contact surface can be designed as a lifting cup. At this lifting cup, to achieve the spring bias, a ramp can then be provided for contacting the underside of the kingpin moving in the direction of the coupling process, so that during coupling initially the bottom of the kingpin comes into contact with the ramp associated contact surface of the first plug-in coupling part, and, during further driving of the fifth-wheel tractor below the semitrailer, a spring preload and thus a contact pressure of the contact surface against the underside of the kingpin is established.

After the mechanical enclosure of the kingpin in a known manner (mechanical coupling process) then the pneumatic cylinder is activated for the actuation of the lifting device, so that then the first plug-in coupling part moved into the coupled, protruding coupling position and thus the electrical and pneumatic lines between the tractor and semitrailer are connected.

If an opening for the passage of the displaceable first plug-in coupling part is covered with cover elements in the uncoupled state, and the cover elements are opened against a spring force during the coupling process of the kingpin, a mechanically simple solution for covering the upwardly open opening is achieved within the fifth-wheel plate, so that the first plug-in coupling part located therein is largely protected against dirt and weather influences. During the coupling process, the bottom of the kingpin slides along the ramp and opens the cover immediately before reaching the coupling position, so that optimum protection of the electrical and/or pneumatic contacts is achieved.

Hereinafter, an embodiment of the invention will be described in detail with reference to the accompanying drawings.

Figure 2:
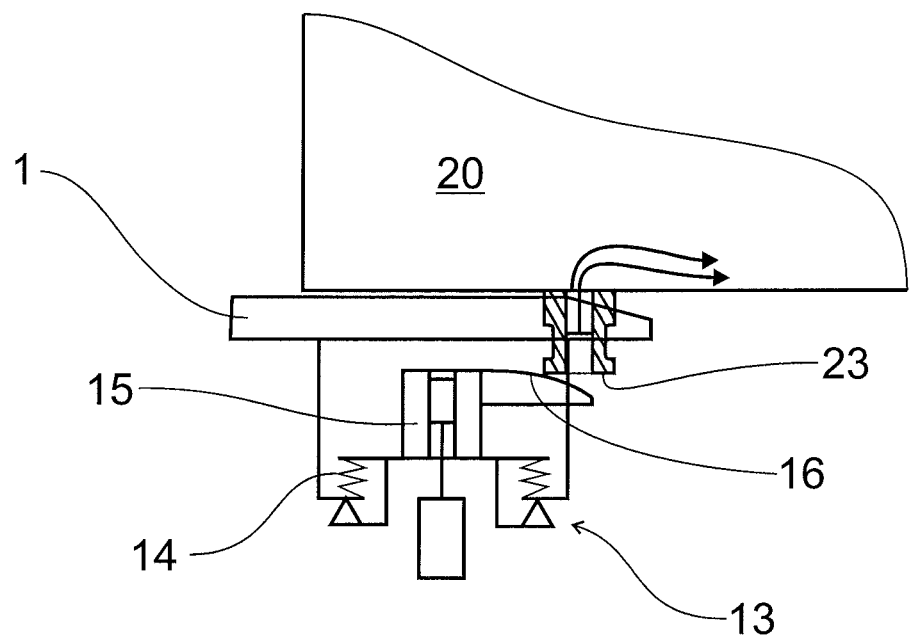
Figure 3:
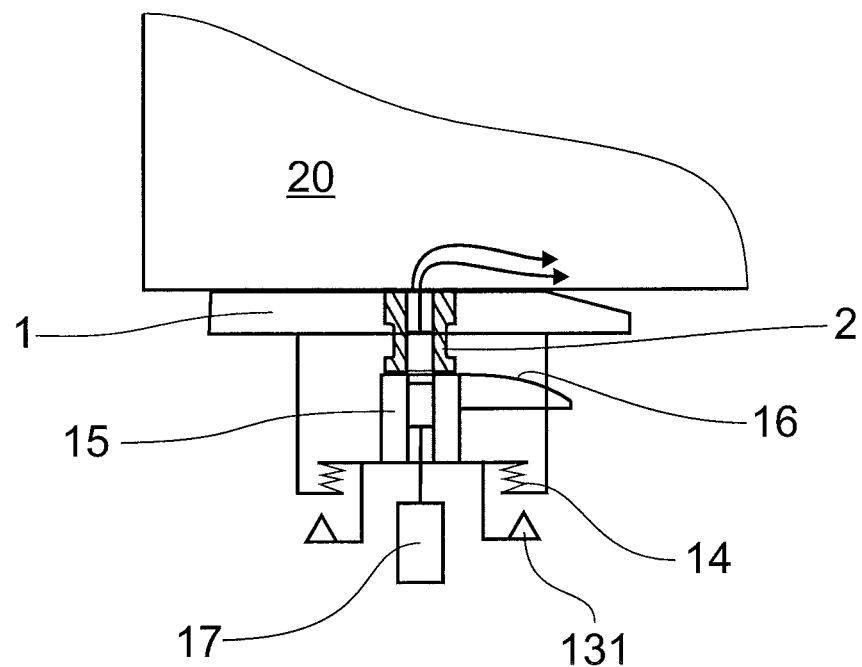
Figure 4:
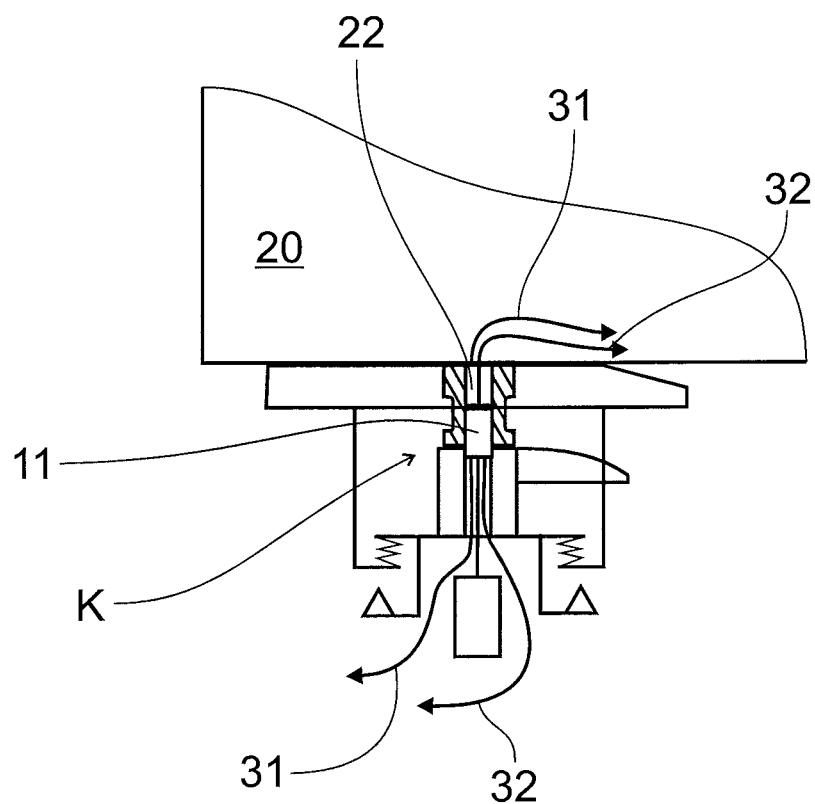

There is shown in:

FIG. 1 a fifth-wheel in partly sectional representation with partially enlarged individual components in the state prior to coupling, FIG. 2 the situation in FIG. 1 during the coupling process, FIG. 3 the situation in FIG. 2 immediately after the mechanical coupling and FIG. 4 the situation in FIG. 3 after completion of the complete coupling process.

FIG. 1 shows a fifth-wheel coupling for the releasable coupling of a fifth-wheel tractor 10, which is indicated only by dashed line, with a semitrailer 20, of which only the bow area is shown. In FIG. 1, the state of the fifth-wheel coupling prior to coupling is schematized, shown partly sectionally and with components depicted partially enlarged. The fifth-wheel coupling includes a fifth-wheel plate 1 on the fifth-wheel tractor 10 and a kingpin 2 in the bow region of the semitrailer 20.

To initiate the coupling process, the fifth-wheel tractor 10 moves backwards with its fifth-wheel plate 1 under the semitrailer 20. In FIG. 1, the state is shown in which the fifth-wheel plate 1 just comes into contact with the semitrailer 20. The fifth-wheel plate 1 is pivotable about an axis oriented horizontal and perpendicular to the direction of travel of the semitrailer tractor, so that it pivots into the substantially horizontal orientation shown in FIG. 2 when driven under the semitrailer 20.

The fifth-wheel plate 1 is associated with a lifting device 12 which is connected to the fifth-wheel plate 1 via a centering unit 13. In this ease, the lifting device 12 includes a lifting cup 15 (see, for example, reference numbers in FIG. 2) with an opening 18, in which a first plug-in coupling part 11 is arranged slidably via a drive, here pneumatic cylinder 17. At the lifting cup 15 of the lifting device 12, a ramp 16 is arranged, which cooperates with the underside 23 of the kingpin 2 during the coupling process. The connection between the fifth-wheel plate 1 and the lifting device 12 occurs via guide springs 14, which allow a "floating" positioning with contact pressure against the underside 23 of the kingpin 2.

Further, a centering unit 13 is arranged at this connection between fifth-wheel plate 1 and lifting device 12, which in the rest position R in the uncoupled state of the first plug-in coupling part 11 shown in FIG. 1, is fixed in its x- and y-position via two centering pins 131 which engage in associated centering bores 132. With adjusting means, not shown, the exact relative position of the first plug-in coupling part 11 can be adjusted to the kingpin 2. Suitable adjusting means are, for example, slots with locking screws or similarly suitable adjusting means.

On the semitrailer 20, the kingpin 2 is provided with its kingpin axis Z arranged vertically. The kingpin 2 has an inner bore 21 executed coaxial with the kingpin axis Z, in which a second plug-in coupling part 22 is seated. The second plug-in coupling part 22 is designed to fit the first plug-in coupling part 11 and together form a plug-in coupling for the electrical and pneumatic connection between fifth-wheel tractor unit 10 and semitrailer 20. Accordingly, pneumatic lines 31 and electrical lines 32 are connected to the second plug-in coupling part 22. Preferably, there are two pneumatic lines for the brake system and two electrical lines that ensure the electrical supply of the semitrailer 20 and at the same time via a simultaneously connected digital signal corresponding to a CAN bus make available the control and switching signals for different users in the semitrailer 20. For this purpose, a corresponding evaluation electronics is to be provided on the electrical line 32, which is not shown here.

On the side of the fifth-wheel tractor 10, of course, the corresponding pneumatic lines 31 and electrical lines 32 are connected to the first plug-in coupling part 11, as shown in FIG. 4. For the sake of clarity, these lines have been omitted in FIGS. 1 to 3.

The coupling process will be described below with reference to the further FIGS. 2 to 4. In FIGS. 2 to 4, the tractor unit 10 is no longer shown for the sake of clarity. However, the position of the fifth-wheel plate 1 relative to the position of the semitrailer 20 makes the coupling process and the position of the fifth-wheel tractor 10 clear.

In FIG. 2, the tractor unit is driven by backing-up further, compared to FIG. 1, so far under the semitrailer 20 that the fifth-wheel plate 1 has oriented parallel to the underbody of the semitrailer 20 (horizontal orientation). The kingpin 2 is at this time taken between the two legs of the U-shaped fifth-wheel plate 1 and comes into contact with the floating bearing lifting device 12, namely the ramp 16 with the bottom 23 of the kingpin 2. Upon further backing-up of the tractor, the entire lifting device 12 is pressed down against the force of the guide springs 14 by running the ramp 16 against the bottom 23 of the kingpin 2.

The centering pins 131 move out of engagement in their associated centering holes 132 of the centering unit 13 so that the lifting device and thus the first plug-in coupling part 11 could move laterally easily (in the x and y direction).

Upon further backing-up of the fifth-wheel tractor 10 in the change in position between FIG. 2 and FIG. 3, a covering device covering of the opening 18, not shown in FIGS. 1 to 4, is moved by the kingpin 2 from the covering position into an open position. The covering device is comprised, for example, of two cover elements that cover the opening 18 in a spring-loaded rest position and protect the opening 18 and thus the first plug-in coupling part 11, which is located below the opening 18, from contamination. When coupling, by the movement (reverse drive) of the kingpin 2 relative to the fifth-wheel plate 1, the covering device consisting of two cover elements are opened by sliding on the side surfaces of the kingpin 2 and thereby opened against the spring force.

In FIG. 3, the fifth-wheel tractor 10 is backed up far enough under the semitrailer 20 that the kingpin 2 is positioned in the center of the fifth-wheel plate 1 and the mechanical coupling process was triggered in a known manner. Thus, the semitrailer 20 is mechanically solidly connected to the fifth-wheel tractor 10.

In the last centimeters of the reverse drive to the state shown in FIG. 3, the underside 23 of the kingpin 2 slid along the ramp 16 to the lifting cup 15, which serves as a bearing surface to the underside 23 of the kingpin 2. In this case, now the entire lifting device 12 with lifting cup 15, ramp 16 and the pneumatic cylinder 17 has been depressed by about 15 millimeters against the force of the springs 14. The force of the springs 14 cause a contact pressure against the underside 23 of the kingpin 2, so that by correct lateral alignment in the x and y directions a complete alignment of the lifting movement of the lifting device with the kingpin axis Z is ensured.

In addition, since the centering unit 13 in the form of centering pins 131 in centering holes 132 is now decoupled, the lifting device 12 with its lifting cup 15 serving as a contact surface is quasi floating, but under considerable spring preload is pressed against the underside 23 of the kingpin 2. Any tilting or tilting movements between the semitrailer 20 and the fifth-wheel plate 1, which can actually occur in practical driving, thus do not disturb the perfect alignment of the lifting device 12, and thus the first plug-in coupling part 11, relative to the kingpin 2 and the second plug-in coupling part 22 housed in the inner bore 21.

In this situation, compressed air is now applied to the pneumatic cylinder 17 via a corresponding valve, so that the first plug-in coupling part 11 is displaced in the direction of the kingpin axis Z from its rest position R into the coupling position K. In this case, the first plug-in coupling part 11 is displaced from the position shown in FIG. 3 (as well as in FIGS. 1 and 2) into the position shown in FIG. 4. The plug-in connection is closed to transfer the electrical signals and to connect the pneumatic lines.

The state in the coupling position K is shown in FIG. 4. Thus, now the pneumatic lines 31 and the electrical lines 32 are connected together. The semitrailer comprised of semitrailer 20 and fifth-wheel tractor 10 can thus be braked and all electrical equipment in the semitrailer 20 can be supplied.

In addition, it should be noted that in the coupling position K, the floating bearing is held by springs 14 of the lifting device 12 with lifting cup 15 and the therein guided first plug-in part 11 under contact pressure against the bottom 23 of the kingpin 2, so that a coaxial alignment with the kingpin axis Z of both the first as well as the second plug-in coupling part 11, 22 is always ensured even if the semitrailer 20 should have slight tilt or inclination differences to the fifth-wheel plate 1.

Thus, small misalignments can be compensated during the coupling process by releasing the floating bearing of the lifting device 12 immediately before the coupling process, which increases the reliability of the coupling process. Furthermore, the wear on the plug-in coupling (plug connection) within the kingpin 2 is reduced since the first plug-in coupling part 11 is always aligned coaxially with the second plug-in coupling part 22, regardless of any slight relative movements (tilting or leaning movements) between the fifth-wheel plate 1 and the semitrailer 20.

To release the clutch, the steps of coupling are carried out in reverse order. First, the first plug-in coupling part 11 is moved from the coupling position K into the rest position R and then the lock of the known fifth-wheel is released. The fifth-wheel tractor 10 can now drive out from under the semitrailer 20, after supporting this.

LIST OF REFERENCE NUMBERS 1 fifth-wheel plate
10 fifth-wheel tractor
11 first plug-in coupling part
12 lifting device 13 centering unit
131 centering pin
132 centering bore
14 spring
15 lifting cup
16 approach ramp
17 drive, pneumatic cylinder
18 opening
2 kingpin
20 semitrailer
21 inner bore
22 second plug-in coupling part
23 bottom
31 pneumatic line
32 electrical line
K coupling position
R rest position
Z kingpin axis

The invention claimed is:

1. A fifth-wheel coupling for the detachable coupling of a fifth-wheel tractor (10) with a semitrailer (20), with a fifth-wheel plate (1) on the fifth-wheel tractor (10), with a kingpin (2) arranged on the semitrailer (20) and engageable with the fifth-wheel plate (1), which kingpin is provided with an inner bore (21) aligned coaxial with a kingpin axis (Z), and with an electrical and pneumatic plug-in coupling for releasably connecting electrical and pneumatic lines (32, 31) between the fifth-wheel tractor (10) and semitrailer (20), wherein the plug-in coupling has a first plug-in coupling part (11) on the fifth-wheel plate (1) and a second plug-in coupling part (22) in the inner bore (21) of the kingpin (2), which are rotationally symmetric, can be plugged into each other and can rotate relative to each other about the kingpin axis (Z), the first plug-in coupling part (11) is displaceably arranged on the fifth-wheel plate (1) moveable by means of a lifting device (12) from a decoupled, retracted rest position (R) into a protruding coupling position (K) in which it is coupled into the second plug-in coupling part (22), the lifting device (12) is provided with a centering unit (13) which centers the relative position of the first plug-in coupling part (11) in the rest position (R) and releases the centering after the coupling process in the coupling position (K) of the first plug-in coupling part (11) in the second plug-in coupling part (22), the centering unit (13) has centering means for precise alignment of the relative position of the first plug-in coupling part (11) in the x and y directions, the kingpin axis (Z) defining a z-direction, and the centering unit (13) comprises guide springs (14) which support the first plug-in coupling part (11) in its position in the coupling position (K).

2. The fifth-wheel coupling according to claim 1, wherein the centering means further comprise two conical centering pins (131) provided on the centering unit (13), which engage in associated centering bores (132) of the first plug-in coupling part (11) in rest position (R).

3. The fifth-wheel coupling according to claim 1 wherein the lifting device (12) has a lifting cup (15) with an opening (18), wherein the first plug-in coupling part (11) is displaceable in the lift cup (15) from the retracted rest position (R) into the coupling position (K) coupled in the second plug-in coupling part (22) projecting through the opening (18).

4. A fifth-wheel coupling for the detachable coupling of a fifth-wheel tractor (10) with a semitrailer (20), with a fifth-wheel plate (1) on the fifth-wheel tractor (10), with a kingpin (2) arranged on the semitrailer (20) and engageable with the fifth-wheel plate (1), which kingpin is provided with an inner bore (21) aligned coaxial with a kingpin axis (Z), and with an electrical and pneumatic plug-in coupling for releasably connecting electrical and pneumatic lines (32, 31) between the fifth-wheel tractor (10) and semitrailer (20), wherein the plug-in coupling has a first plug-in coupling part (11) on the fifth-wheel plate (1) and a second plug-in coupling part (22) in the inner bore (21) of the kingpin (2), which are rotationally symmetric, can be plugged into each other and can rotate relative to each other about the kingpin axis (Z), the first plug-in coupling part (11) is displaceably arranged on the fifth-wheel plate (1) moveable by means of a lifting device (12) from a decoupled, retracted rest position (R) into a protruding coupling position (K) in which it is coupled into the second plug-in coupling part (22), the lifting device (12) is provided with a centering unit (13) which centers the relative position of the first plug-in coupling part (11) in the rest position (R) and releases the centering after the coupling process in the coupling position (K) of the first plug-in coupling part (11) in the second plug-in coupling part (22), and the lifting device (12) together with the centering unit (13) is floatingly mounted on the fifth-wheel plate (1) against a spring load by springs (14), wherein on the lifting device (12) with centering unit (13) is provided with a ramp (16) which cooperates during the coupling process with the underside (23) of the kingpin (2) so that the lifting device (12) together with centering unit (13) is pressed down against the spring load.

5. A fifth-wheel coupling for the detachable coupling of a fifth-wheel tractor (10) with a semitrailer (20), with a fifth-wheel plate (1) on the fifth-wheel tractor (10), with a kingpin (2) arranged on the semitrailer (20) and engageable with the fifth-wheel plate (1), which kingpin is provided with an inner bore (21) aligned coaxial with a kingpin axis (Z), and with an electrical and pneumatic plug-in coupling for releasably connecting electrical and pneumatic lines (32, 31) between the fifth-wheel tractor (10) and semitrailer (20), wherein the plug-in coupling has a first plug-in coupling part (11) on the fifth-wheel plate (1) and a second plug-in coupling part (22) in the inner bore (21) of the kingpin (2), which are rotationally symmetric, can be plugged into each other and can rotate relative to each other about the kingpin axis (Z), the first plug-in coupling part (11) is displaceably arranged on the fifth-wheel plate (1) moveable by means of a lifting device (12) from a decoupled, retracted rest position (R) into a protruding coupling position (K) in which it is coupled into the second plug-in coupling part (22), the lifting device (12) is provided with a centering unit (13) which centers the relative position of the first plug-in coupling part (11) in the rest position (R) and releases the centering after the coupling process in the coupling position (K) of the first plug-in coupling part (11) in the second plug-in coupling part (22), and the lifting device (12) has a drive (17) for a lifting operation, which is actuated after locking of the kingpin (2) in the fifth-wheel plate (1).

6. A method for coupling a fifth-wheel coupling comprised of a fifth-wheel plate (1) on a fifth-wheel tractor (10)

and a kingpin (2) on a semitrailer (20), in which the kingpin (2) is engaged with the fifth-wheel plate (1) and electrical and pneumatic lines (31, 32) are connected by means of a plug-in coupling, wherein the plug-in coupling has a first plug-in coupling part (11) on the fifth-wheel plate (1) and a second plug-in coupling part (22) in an inner bore (21) of the kingpin (2) coaxially aligned With the kingpin axis (Z), which are rotationally symmetric, can be plugged into each other and can rotate relative to each other about the kingpin axis (Z), and the first plug coupling part (11) on the fifth-wheel plate (1) is moved during coupling from a decoupled, retracted rest position (R) into a protruding coupling position (K) in which it is coupled into the second plug-in coupling part (22) wherein the first plug-in couple part (11) in the coupled, protruding coupling position (K) is supported floating, while a first plug-in coupling part (11) associated bearing surface is pressed by spring force against the underside (23) of the kingpin (2), and wherein on the lifting device (12) with centering unit (13) is provided with a ramp (16) which cooperates during the coupling process with the underside (23) of the kingpin (2) so that the lifting device (12) together with centering unit 13 is pressed down against the spring load, characterized by the steps holding the first plug-in coupling part (11) centered in the decoupled, retracted rest position (R), releasing the centering of the first plug coupling part (11) when moving the first plug coupling part (11) into the coupled, protruding coupling position (K).

7. The method according to claim 6, wherein during the coupling process first the underside (23) of the kingpin (2) comes into contact with a contact surface of a ramp (16) of the first plug-in coupling part (11), and that during further driving of the fifth-wheel tractor (10) under the semitrailer (20) a spring preload and thus a contact pressure of the contact surface against the underside (23) of the kingpin (2) is established.

8. The method according to claim 7, wherein after the mechanical locking of the kingpin (2) in the fifth-wheel plate (1) the first plug-in coupling part (11) is displaced into the coupled, protruding coupling position and thus the electrical and pneumatic lines (31, 32) are connected between the fifth-wheel tractor (10) and semitrailer (20).

9. The method according to claim 8, wherein, during the coupling process, after determining the mechanical locking of the kingpin (2) in the fifth-wheel plate (1), the displacement of the first plug-in coupling part (11) into the coupled, protruding coupling position (K) is triggered.

* * * * *